United States Patent [19]

Borman

[11] 4,211,689

[45] Jul. 8, 1980

[54] COPOLYESTERS OF POLYBUTYLENE TEREPHTHALATE

[75] Inventor: Willem F. H. Borman, Evansville, Ind.

[73] Assignee: General Electric Company, Pittsfield, Mass.

[21] Appl. No.: 966,880

[22] Filed: Dec. 6, 1978

[51] Int. Cl.$^2$ .................. C08K 7/14; C08L 67/02
[52] U.S. Cl. .................. 260/40 R; 528/307; 528/308; 528/309; 525/444; 525/448
[58] Field of Search ............ 260/40 R, 860; 528/307, 528/308, 309

[56] References Cited

U.S. PATENT DOCUMENTS

| | | | |
|---|---|---|---|
| 4,064,098 | 12/1977 | Saitoh et al. | 260/40 R |
| 4,122,061 | 10/1978 | Holub et al. | 260/40 R |
| 4,125,571 | 11/1978 | Scott et al. | 260/860 |
| 4,132,707 | 1/1979 | Borman | 260/860 X |
| 4,140,670 | 2/1979 | Charles et al. | 260/40 R |

Primary Examiner—Lucille M. Phynes
Attorney, Agent, or Firm—Morgan, Finnegan, Pine, Foley & Lee

[57] ABSTRACT

Novel thermoplastic copolyesters useful in fibers, films and molding resins are prepared by the transesterfication of (a) straight or branched chain poly(1,4-butylene terephthalates) and (b) a polyester of (i) a cycloaliphatic 1,2-dicarboxylic acid or a derivative thereof, etc., and (ii) 1,4-butanediol. Compositions comprising the new copolymers with high molecular weight poly(1,4-butylene terephthalates) and with reinforcing agents are also disclosed.

13 Claims, No Drawings

COPOLYESTERS OF POLYBUTYLENE TEREPHTHALATE

This invention relates to novel thermoplastic copolyesters prepared by the transesterifcation of (a) straight or branched chain poly(1,4-butylene terephthalates) and (b) a polyester of (i) a cycloaliphatic 1,2-dicarboxylic acid or a derivative thereof and (ii) 1,4-butanediol. The compounds are useful as fibers, films and as molding resin components and to enhance the physical properties of polyester resins.

BACKGROUND OF THE INVENTION

Poly(1,4-butylene terephthalate) is a widely used molding resin because of its rapid crystallization and also because of its rigidity, good dimensional stability, low water absorption and good electrical properties. The resin also has a high heat resistance, inherent lubricity and excellent chemical resistance. One restriction on the use of this valuable resin, however, is the fact that the impact strengths of moldings tend to be somewhat inadequate for applications where the molded part is likely to be subjected to severe service conditions. Another important restriction is a lack of elastic properties, which limits the utility of poly-(1,4-butylene terephthalate) in making good fibers and films. Both disadvantages are overcome by providing block copolyesters in which one segment is poly(1,4-butylene terephthalate) and the other comprises polytetramethylene oxide (U.S. Pat. Nos. 3,651,014 and 3,766,146) or poly(1,4-butylene terephthalate-co-o-phthalate) (U.S. Pat. No. 4,096,126), or poly(hexylene azelate-co-isophthalate), etc. (U.S. Ser. No. 752,325, filed Dec. 20, 1976). Each of the patents and the application is incorporated herein by reference. The copolyester having the aliphatic ether segments has been reported to have thermal stability and weatherability shortcomings. The random copolyester having orthophthalate segments is slow to crystallize and difficult to made and use because orthophthalic anhydride sublimes from it at elevated temperature. The copolyester with aromatic-aliphatic or aliphatic acid segments has relatively low elastic recovery in comparison to the other polymers mentioned.

It has now been discovered that if a poly(1,4-butylene terephthalate) resin is chemically modified by being segmented in a copolyester in which a first portion of the repeating units are poly(1,4-butylene terephthalate) blocks and a second portion of the repeating units are blocks of a polyester of a cycloaliphatic 1,2-dicarboxylic acid or a derivative thereof and 1,4-butanediol, then the resulting copolyesters will have enhanced impact resistance, compared to the resin itself, and improved crystallization rate and stability, compared to other copolyesters mentioned. The improvement in impact resistance is achieved with minimal loss of other physical properties and is accompanied with a measurable increase in toughness. It has also been discovered that the presence of the internal units of the other polyesters modifies the rate at which poly(1,4-butylene terephthalate) crystallizes from the melt in a very desirable manner.

If the polyesters are added to the reactor during the preparation of poly(1,4-butylene terephthalate) after ester interchange between dimethyl terephthalate and 1,4-butanediol, there is caused a most desirable modification in the properties of the resulting polyester resins.

After completion of the reaction and molding the copolyesters, the moldings are improved in toughness and reduced in notch sensitivity as compared to bars molded from unmodified poly(1,4-butylene terephthalate). Even at only 10% of the second polyester content, the increase in impact strength is so marked that some of the samples cannot even be broken.

In addition to their use in injection molding applications, the polyester coreactants have also been found to be beneficial in improving the properties of poly(1,4-butylene therephthalate) resins used in other applications, such as profile extrusion, extrusion- and injection blow molding, thermo-forming, foam molding; in these cases small amounts of ester-forming branching agents may be added to enhance the melt elasticity properties of the products for easier processing.

The copolyester products have also been converted to valuable modifications by adding reinforcements and/or fillers, such as glass fibers, talc, clay, mica, and the like. Surprisingly, the increased toughness of the new copolyesters compensates for the greater brittleness usually induced by the incorporation of such non-soluble additives and fillers.

DESCRIPTION OF THE INVENTION

According to this invention, there are provided novel thermoplastic copolyesters which consist essentially of units derived from:

(a) a terminally-reactive poly(1,4-butylene terephthalate); and (b) a terminally-reactive polyester of (i) a cycloaliphatic 1,2-dicarboxylic acid or a derivative thereof and mixtures thereof and (ii) 1,4-butanediol.

Although the units can be randomized, it is preferred that the new copolyesters be prepared by the reaction of terminally-reactive poly(butylene terephthalate) and a terminally-reactive polyester as defined in paragraph (b), in the presence of a catalyst for transesterification, such as zinc acetate, manganese acetate, titanium esters, and the like. The terminal groups can comprise hydroxyl, carboxyl, carboalkoxy, and the like, including reactive derivatives thereof. The result of reaction between two terminally reactive groups, of course, must be an ester linkage. After initial mixing, polymerization is carried out under standard conditions, e.g., 220° to 280° C., in a high vacuum, e.g., 0.1 to 2 mm Hg, to form the copolymers.

The polyester designated component (b) is prepared from a wide variety of cycloaliphatic 1,2-dicarboxylic acids. By way of illustration, there can be used 1,2-dicarboxylic anhydride compounds of the formulae

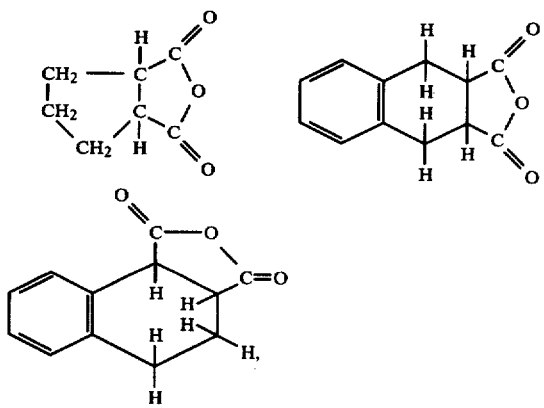

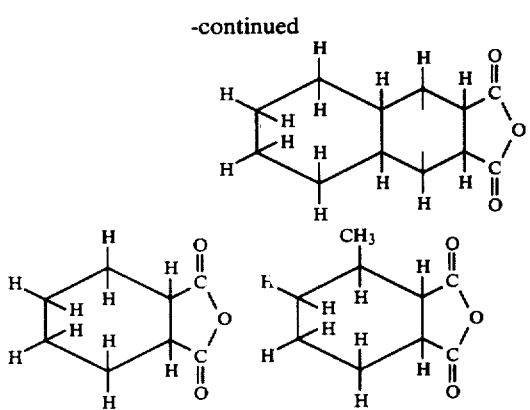

as well as the diacids themselves and their $C_1$-$C_6$ alkyl esters, and the like or a mixture of any of the foregoing. Preferably, they will comprise 3-methylhexahydrophthalic acid, hexahydrophthalic acid or a derivative thereof.

The block copolyesters of this invention can comprise from 1 to 99 mole % of the units of poly(1,4-butylene terephthalate), and preferably from 30 to 80 mole %. In the block copolyesters the poly(1,4-butylene terephthalate) segments before incorporation into the copolyesters, will preferably have an intrinsic viscosity of about 0.1 dl./g. and preferably, between 0.1 and 0.5 dl./g., as measured in a 60:40 mixture of phenol/tetrachloroethane at 30° C. The balance, 99 to 1 mole %, and preferably 20 to 70 mole % of the copolyester will comprise units of component (b).

As will be understood by those skilled in this art, the copolyesters can be straight chain or branched, e.g., by use of a branching component, e.g., 0.05 to 3 mole %, based on terephthalate units, of a branching component which contains at least three ester-forming groups. This can be a polyol, e.g., pentaerythritol, trimethylolpropane, and the like, or a polybasic acid compound, e.g., trimethyl trimesate, and the like. Pentaerythritol is a preferred polyol branched component.

The copolyesters may be employed as such in the fabrication of fibers, films and molded articles or they may be blended with other polymers, especially preferably poly(1,4-butylene terephthalate) straight chain or branched (as described), and with stabilizers, reinforcing agents and/or flame retardant additives.

In one feature of the invention, the copolyesters may be combined with high molecular weight poly(1,4-butylene terephthalate), i.e., having an intrinsic viscosity of at least 0.7 dl./g., as measured in a 60:40 mixture of phenol/tetrachloroethane at 30° C. These compositions can vary broadly, but, preferably, will contain from 1 to 99 parts by weight of the copolyester and from 99 to 1 parts by weight of the high molecular weight poly(1,4-butylene terephthalate), straight chain or branched.

In other preferred features, the compositions will include fillers and/or reinforcing agents. Such agents are well known but, illustratively, they may be selected from the group consisting of metals, such as aluminum, iron or nickel particles and the like, and non-metals, such as carbon filaments, silicates, such as acicular calcium silicate, asbestos, titanium dioxide, potassium titanate and titanate whiskers, wollastonite, alumina silicates such as clay, magnesium or aluminum silicates, such as the various micas and talc, glass flakes and fibers.

Although it is only necessary to have at least an effective amount of filler and/or reinforcing agent or reinforcing amount of the reinforcement present, in general the compositions will comprise from 1 to 80% by weight of the total composition of the filler and/or reinforcing agent.

In particular, the preferred reinforcing fillers are of glass, and it is usually preferred to employ fibrous glass filaments comprised of lime-alumina borosilicate glass that is relatively soda free. This is known as "E" glass. However, other glasses are useful where electrical properties are not iportant, e.g., the low soda glass known as "C" glass. The filaments are made by standard processes, e.g., by steam or air blowing, flame blowing and mechanical pulling. The filament diameters range from about 0.00012 to 0.00075 inch, but this is not critical to the present invention. Glass fibers may be surface coated in accordance with standard procedures to improve their reinforcing performances. In general, best properties will be obtained from reinforced compositions that contain from 5 to 50 percent by weight of the glass reinforced composition.

The length of glass filaments and whether or not they are bundled into fibers and the fibers bundled in turn to yarns, ropes or rovings, or woven into mats, and the like, are also not critical to the practice of the invention. In preparing the present composition, it is convenient to use the filamentous glass in the form of chopped strands of from about ⅛ inch to about 1 inch long, preferably less than ¼ inch long. In articles that are molded from the compositions of the invention, even shorter lengths will be encountered because during compounding, considerable fragmentation will occur. This is desirable, however, because the best properties are exhibited by thermoplastic injection molded articles in which the filament lengths lie between about 0.000005 inch and 0.12 (⅛) inch.

Compositions of this invention can be prepared by a number of procedures. In one way, any additives, e.g., fillers or fibers, pigments, stabilizers, etc., are put into an extrusion compounder with the resinous components to produce molding pellets. The additives are dispersed in a matrix of the resin in the process. In another procedure, the additive(s) and the resin are dry blended then either fluxed on a mill and comminuted, or they are extruded and chopped. The additives can also be mixed with the resin(s) and directly molded, e.g., by injection or transfer molding techniques.

In addition, compounding should be carried out to insure that the residence time in the machine is short, the temperature is carefully controlled; the friction heat is utilized; and an intimate blend between the resin and the reinforcement and/or other additives is obtained.

Although it is not essential, best results are obtained if the ingredients are pre-compounded, pelletized and then molded. Pre-compounding can be carried out in conventional equipment. For example, after carefully pre-drying the copolyester, and polyester resins and the additives, e.g., reinforcing agent, e.g., under vacuum at 100° C. for 12 hours, a single screw extruder is fed with a dry blend of the ingredients, the screw employed having a long transition section to insure proper melting. On the other hand, a twin screw extrusion machine, e.g., a 28 mm Werner Pfleiderer machine can be fed with resin and additives at the feed port and reinforcement downstream. In either case, a generally suitable machine temperature will be about 450° to 560° F.

The pre-compounded composition can be extruded and cut up into molding compounds such as conventional granules, pellets, etc., by standard techniques.

The composition can be molded in any equipment conventionally used for thermoplastic compositions.

DESCRIPTION OF THE PREFERRED EMBODIMENTS

The following examples illustrate compositions according to the present invention. They are not limiting. All parts are by weight.

EXAMPLE 1

(a) Poly(1,4-butylene-hexahydrophthalate) (PBHP)

15.4 g., 0.10 mol., of cis-1,2-cyclohexanedicarboxylic anhydride (hexahydrophthalic anhydride, HHPA), 16.0 g., 0.18 mol., 1,4-butanediol and 0.03 g. of tetra(2-ethylhexyl)titanate are placed in a 25×200 mm. cylindrical glass reactor provided with a side arm. A spiral-shaped glass stirring rod is inserted through a glass rotary seal held by a rubber stopper in the top of the reactor. The stirrer is connected to a variable speed electric drive motor. The side arm of the reactor is connected to a distillate collection apparatus.

The apparatus is immersed in an oil bath held at 175° C. After the reactants melt, the oil temperature is raised in stages during three hours until a temperature of 222° C., is reached. After standing overnight at 23° C., 0.05 g. of a butyl tinacid catalyst, sold by M & T Corporation under the designation "Fascat 4100" is added, and the reaction is resumed for 4½ hours at temperatures ranging from 205° C. to 227° C. and vacuum down to 1.4 mm. The reaction product is poured into an aluminum dish and left to cool to a highly viscous, sticky, transparent product.

(b)(i) 50 mol % Hexahydrophthalae Block Copolymer 10 g. of PBHP from step (a) and 10.0 g. of poly(1,4-butylene terephthalate) (PBT), intrinsic viscosity, 0.41 dl./g. are coreacted by placing them in the apparatus described in step (a). The ingredients are heated to 250° C. under vacuum down to 0.2 mm. Hg. for a total of 75 minutes. No formation of solid sublimate is observed. The product cools to a tough, elastic, semi-crystalline mass.

(b)(ii) 25 mol % Hexahydrophthalate Block Copolymer

In a fashion similar to step (b)(i), 5 g. of PBHP is co-reacted with 15 g. PBT to yield a tough, white, crystalline product without formation of a solid sublimate.

(b)(iii) 25 mol % Random Hexahydrophthalate Block Copolymer 3.9 g., 0.025 mol. HHPA, 14.6 g., 0.075 mol of dimethyl terephthalate, 15.3 g., 0.17 mol, of 1,4-butanediol and 0.02 g. of tetra(2-ethyl hexyl)titanate are polymerized as described in (a). After a total reaction time of three hours, the product is removed from the reactor and cools to a semi-crystalline, elastic solid.

Thermal properties are determined by differential scanning calorimetry (DSC) on the two block copolyesters (b)(i) and (b)(ii) and on the random copolyester (b)(iii), with the results set forth in Table 1.

Table 1
DSC Data on (PBT-PBHP) Block Copolymers

| Example | Tm (°C.) | Tc (°C.) | Crystallinity % |
|---|---|---|---|
| 50% Block Copolymer(b) (i) | 182 | 106 | 11 |
| 25% Block Copolymer(b) (ii) | 215 | 169 | 25 |
| 25% Random Copolymer(b) (iii) | 181 | 112 | 21 |

% Crystallinity is calculated by dividing the observed heat of fusion of the sample in cal./g. by 0.345. The "0.345" divisor is used because the heat of fusion of pure PBT crystals is 34.5 cal./g.

The block copolymers according to this invention at the 25% level show a desirable increase of crystallisation, as compared to the random copolymer. Furthermore, if phthalic anhydride is used in place of HHPA, sublimation of solid material into the distillation apparatus is always observed.

EXAMPLE 2

(a) Branched 50:50 PBHP-PBT Block Copolyesters 50 g. of poly(butylene hexahydrophthalate) (PBHP), 50 g. PBT and 0.12 g. of pentaerythritol are co-reacted for two hours at up to 253° C. and 0.1 mm Hg. vacuum. The co-reacted product is ground with dry ice through a Wiley mill, dried and extruded at 220° C. through a 0.042×0.615″ orifice in a melt strength tester manufactured by Toyo Seiki Co. (Tokyo, Japan). The product has a melt viscosity of 6,000 poises at a shear rate of 41 sec$^{-1}$, and a melt strength of 0.3 g. The extrudate can be hand-drawn to a highly elastic filament. Unbranched block copolymer cannot be extruded into continuous filaments under these conditions, but of course is useful in molding applications.

A block copolymer of 55:45 PBT:PBHP also containing 0.12 wt % pentaerythritol gives the following melt strength data:

Melt viscosity, 12,000 p. at a shear rate of 82 sec$^{-1}$, melt strength, 6.3 g.

A similar branched 55:45 block copolymer, but of lower molecular weight, gives the following results:

Melt viscosity, 6,800 p., shear rate 82 sec$^{-1}$, melt strength, 1 g.

A 60:40 PBT:PBHP branched block copolymer gives the following data:

Melt viscosity, 7,500 p at shear rate 82 sec$^{-1}$, melt strength, 1.0 g.

All extrudates can be oriented to tough, elastic filaments.

EXAMPLE 3

(a) Poly(1,4-butylene hexahydro-3-methylphthalate) (BMP)

84 g., 0.50 mol, 3-methyl-cis-1,2-cyclohexane-dicarboxylic anhydride (HHMPA, tradename "Curacid 600" of Dainippon Ink and Chemical Co.) reacted with 55 g., 0.61 mol, of 1,4-butanediol and 0.1 g. tetra(2-ethyl hexyl)titanate for three hours at up to 260° C. and down to 0.3 mm Hg. The product cools to a sticky solid.

(b) PBT-BMP 55:45 Branched Copolymer 45.3 g. of the product of step (a), 55 g. of PBT and 0.12 g., 0.12 w/w %, of pentaerythritol are coreacted at up to 251° C. and down to 0.1 mm. Hg. for a total of 135 minutes. Forty minutes into the reaction, 0.15 g. of stabilizer (Irganox 1093) is also added. The product is tough and semi-crystalline. On extrusion through the melt strength tester at 220° C., through a 0.042×0.615" orifice at a shear rate of 82 sec⁻¹, the product has a melt viscosity of 7,800 poise and a melt strength of 1.7 g. It can be oriented to strong, elastic filaments.

EXAMPLE 4

PBT-Block Copolymer Blends 49.85 parts poly(butylene terephthalate), 20.0 parts 56:44 poly(butylene terephthalate-co-butylene hexahydrophthalate), 30.0 parts glass fibers, 0.05 parts phosphite stabilizer (Ferro 904) and 0.1 parts mold release agent (pentaerythritol tetrastearate) are tumble blended, co-extruded, pelletized and molded into test specimens, having the following properties.

| | |
|---|---|
| Melt viscosity, pellets, 250° C., poises | 6,300 |
| Flexural strength, psi | 22,300 |
| Flexural modulus, psi | 750,500 |
| Tensile strength, psi | 14,350 |
| Tensile elongation, % | 14 |
| Izod impact strength, ft.lbs./in. | |
| Notched | 1.8 |
| Unnotched | 13 |
| Distortion Temp. under Load, 264 psi, °F. | 374 |

A high impact composition is obtained.

Many variations will suggest themselves to those skilled in this art in light of the above-detailed description. For example, instead of hexahydrophthalic anhydride and the 3-methyl derivative thereof, the corresponding tetrahydrophthalic anhydrides can be used, as well as the other cycloaliphatic 1,2-dicarboxylic acids and anhydrides illustrated by formula above. All such obvious variations are within the full intended scope of the appended claims.

What is claimed is:

1. A thermoplastic copolyester which is linear or branched and which consists essentially of units derived from:
    (a) a terminally-reactive poly(1,4-butylene terephthalate); and
    (b) a terminally-reactive polymeter of (i) a cycloaliphatic 1,2-dicarboxylic acid or a derivative thereof, and mixtures thereof and (ii) 1,4-butanediol.

2. A thermoplastic copolyester as defined in claim 1 wherein said dicarboxylic acid is selected from the group consisting of 3-methylhexahydrophthalic acid and hexahydrophthalic acid.

3. A thermoplastic copolyester as defined in claim 1 which is branched.

4. A thermoplastic copolyester as defined in claim 3 which includes from 0.05 to 3 mole %, based on terephthalate units, of a branching component which contains at least three esterforming groups.

5. A thermoplastic copolyester as defined in claim 4 wherein the branching component is a polyol.

6. A thermoplastic copolyester as defined in claim 5 wherein the branching component is pentaerythritol.

7. A thermoplastic copolyester as defined in claim 1 wherein polyester units (b) comprise from about 1 to about 99 mole % of the total units (a) and (b).

8. A thermoplastic block copolyester as defined in claim 7 wherein polyester blocks (b) comprise from about 20 to about 70 mole % of the total blocks (a) and (b).

9. A thermoplastic composition as defined in claim 1 which also includes (c) an effective amount of a reinforcing agent and/or a filler.

10. A thermoplastic composition comprising
    I. a thermoplastic poly(1,4-butylene terepthalate) resin; and
    II. a thermoplastic copolyester which is linear or branched and which consists essentially of units derived from: (a) a terminally reactive poly(1,4-butylene terephthalate); and (b) a polyester of (i) a cycloaliphatic 1,2-dicarboxylic acid or a derivative thereof and mixtures thereof and (ii) 1,4-butanediol.

11. A thermoplastic composition as defined in claim 10 which also includes (c) an effective amount of a reinforcing agent and/or a filler.

12. A thermoplastic composition as defined in claim 11 wherein the reinforcing agent (c) is fibrous gases.

13. A composition as defined in claim 10 wherein component I is linear, component II(a) is linear and component II(b)(i) comprises (1,4-butylene hexahydrophthalate).

* * * * *